United States Patent [19]
Lin et al.

[11] Patent Number: 5,740,344
[45] Date of Patent: Apr. 14, 1998

[54] TEXTURE FILTER APPARATUS FOR COMPUTER GRAPHICS SYSTEM

[75] Inventors: Yu-Ming Lin, Hsinchu; Chun-Kai Huang, Taichung; Wei-Kuo Chia, Hsinchu, all of Taiwan

[73] Assignee: ITRI-Industrial Technology Research Institute, Hsinchu, Taiwan

[21] Appl. No.: 598,521

[22] Filed: Feb. 8, 1996

[51] Int. Cl.$^6$ .................................................. G06T 11/40
[52] U.S. Cl. ........................... 395/130; 395/131; 364/723
[58] Field of Search .............................. 395/130, 131, 395/132; 364/723, 734, 750.5, 759

[56] References Cited

U.S. PATENT DOCUMENTS

| | | | |
|---|---|---|---|
| 5,001,651 | 3/1991 | Rehme et al. | 364/723 X |
| 5,046,023 | 9/1991 | Katsura et al. | |
| 5,185,856 | 2/1993 | Alcorn et al. | 395/130 |
| 5,222,205 | 6/1993 | Larson et al. | 395/130 |
| 5,268,681 | 12/1993 | Lin et al. | 345/200 |
| 5,268,682 | 12/1993 | Yang et al. | 345/200 |
| 5,287,299 | 2/1994 | Lin | 364/759 |
| 5,289,399 | 2/1994 | Yoshida | 364/759 X |
| 5,321,425 | 6/1994 | Chia et al. | 345/200 |
| 5,422,657 | 6/1995 | Wang et al. | 345/186 |
| 5,513,120 | 4/1996 | Berlad | 364/723 |

OTHER PUBLICATIONS

L. Williams, *Pyramidal Parametrics*, Computer Graphics, vol. 17, No. 3, pp. 1–11, Jul., 1983.

W. Newman & R. Sproull, *Principles of Interactive Computer Graphics*, ch. 25, pp. 389–410 (1979).

*Primary Examiner*—Mark K. Zimmerman
*Attorney, Agent, or Firm*—Meltzer, Lippe, Goldstein, Wolf & Schlissel, P.C.

[57] ABSTRACT

A process and apparatus are disclosed for obtaining a texture color value $C_r$ for an object surface point from two texture color values $C_{ri}$ and $C_{rj}$ (which themselves may be interpolated texture color values), of texture data points $C_i$ and $C_j$, respectively. The object surface point is a distance W from the texture data point $C_i$ and a distance 1−W from the object surface point $C_j$, where W is an n-bit value. The process includes the steps of multiplying each of the texture colors $C_{ri}$ and $C_{rj}$ by each integer from 0 to $2^{n-1}$ to produce $2^n-1$ products for each color. The product of $C_{ri}$ with $2^{n-1}-W'$ and the product of $C_{rj}$ with W' are selected from these produced products, where W' is the rounded product of W and $2^{n-1}$. The two selected products are added together to produce the sum $(2^{n-1}-W') \cdot C_{ri} + W' \cdot C_{rj}$, and the sum thus produced is divided by $2^{n-1}$ to produce the interpolated color. The apparatus for producing the interpolated color uses integer arithmetic for producing the texture color and can operate in a pipelined fashion.

7 Claims, 4 Drawing Sheets

TEXTURE FILTER APPARATUS FOR COMPUTER GRAPHICS SYSTEM

RELATED APPLICATIONS

The following patents and patent applications are commonly assigned to the assignee of this application and contain subject matter related to the subject matter of this application:

1. Patent application Ser. No. 08/598,522, entitled, "Virtual Coordinate To Linear Physical Memory Address Converter For Computer Graphics System," filed for Erh-Chia Wang, Wei-Kuo Chia, and Chun-Yang Cheng on even date herewith;

2. Patent application Ser. No. 08/598,520, entitled, "Blending Apparatus for Computer Graphics System," filed for Jan-Han Hsiao, Wei-Kuo Chia and Chun-Kai Huang on even date herewith;

3. Patent application Ser. No. 08/598,523, entitled, "A Mip Map/Rip Map Texture Linear Addressing Memory Organization and Address Generator," filed for Ruen-Rone Lee, Chun-Kai Huang and Wei-Kuo Chia on even date herewith;

4. U.S. Pat. No. 5,422,657, entitled, "A Graphics Memory Architecture For Multi-mode Display System," filed for Shu-Wei Wang, Wei-Kuo Chia, Chun-Kai Huang and Chun-Chie Hsiao on Sep. 13, 1993;

5. U.S. Pat. No. 5,321,425, entitled, "Resolution Independent Screen Refresh Strategy," filed for Wei-Kuo Chia, Jiunn-Min Jue, Gen-Hong Chen and Chih-Yuan Liu on Feb. 19, 1992;

6. U.S. Pat. No. 5,268,682, entitled, "Resolution Independent Raster Display System," filed for Wen-Jann Yang, Chih-Yuan Liu and Bor-Chuan Kuo on Oct. 7, 1991; and 7. U.S. Pat. No. 5,268,681, entitled, "Memory Architecture With Graphics Generator Including A Divide By Five Divider," filed for Cheun-Song Lin, Bor-Chuan Kuo and Rong-Chung Chen on Oct. 7, 1991.

The above listed patents and patent applications are incorporated herein by reference.

FIELD OF THE INVENTION

The present invention relates to computer graphics systems which can perform three-dimensional (3D) rendering. In particular, the present invention relates to drawing texture on the surfaces of 3D objects which are displayed on a display device.

BACKGROUND OF THE INVENTION

FIG. 1 depicts a conventional computer system 10. The computer system 10 has a processor 12, a main memory 14, a disk memory 16 and an input device 18, such as a keyboard and mouse. The devices 12–18 are connected to a bus 20 which transfers data, i.e., instructions and information, between each of these devices 12–18. A graphics controller 30 is also connected to the bus 20. As shown, the graphics controller 30 includes a drawing processor 32. The drawing processor 32 is also connected to an address generator 36 and a data input of a frame buffer 34. The address generator 36, in turn, is connected to RAS (row address select), CAS (column address select) and chip select inputs of the frame buffer 34. Illustratively, the frame buffer 34 is implemented with plural VRAMs (video random access memories) or DRAMS (dynamic random access memories). The frame buffer 34 is connected to a display device 38, such as a cathode ray tube (CRT) or liquid crystal display (LCD) monitor.

The drawing processor 32 receives instructions from the processor 12 for drawing objects. For instance, in the case of a computer aided design (CAD) application, the processor 12 may receive user input regarding creating and locating objects in 3-D space. The processor 12, in turn, transfers instructions regarding the size, location, texture, translucence, etc. of such objects to the drawing processor 32. In response, the drawing processor 32 creates a pixel image representation of a plane of view of such objects in 3-D space. The pixels of the image of each plane of view form part of a frame that is stored by the drawing processor 32 in the frame buffer 34. Several drawing processors 32 are known, such as is disclosed in U.S. Pat. Nos. 5,046,023 and 5,185,856. The latter reference discloses a drawing processor that is specifically adapted for rendering 3-D objects.

A computer system 10 capable of performing 3-D rendering advantageously "maps" texture onto the rendered object. The mapping of texture onto objects is well known and is not discussed in detail herein. See U.S. Pat. No. 5,222,205; L. Williams, *Pyramidal Parametrics*, ACM COMPUTER GRAPHICS, vol. 17, no.3 p. 1–11 (1983); and W. NEWMAN & R. SPROULL, PRINCIPLES OF INTERACTIVE COMPUTER GRAPHICS, 2d ed., p. 389–410. Suffice it to say that the texture pattern may be considered a renderable source texture surface which is to be mapped onto a destination object surface. The object thus formed may then be mapped onto the destination plane of view.

Such mapping is very computation intensive. As noted in the above-noted Williams article, such mapping may require sampling the texture data in a fashion which is suited to the view of the surface of the destination object. That is, the visibility of the texture detail on the object surface depends on how close or how far the object surface is located in 3-D space from the plane of view. As the plane of view is brought closer to the object surface, more texture detail is visible. As the plane of view is moved away from the object surface, less texture detail is visible.

To reduce the amount of computation involved in mapping texture when the object is moved closer or farther from the plain of view, the Williams article proposes to initially provide subsamplings of the textured data. This is illustrated in FIG. 2. As shown, the texture data is stored in 2-D data arrays. The texture data in each array is indexed, i.e., addressed with 2-D virtual address coordinates (u,v), i.e., one in each direction U and V. The texture data consists of RGB data including one fixed length data unit (e.g., byte) for each color red (R), green (G) and blue (B) per point of texture data. The R data is stored in array 61, the G data is stored in array 62 and the B data is stored in array 63. As per the Williams memory storage scheme, the array 64 is used for storing subsampled versions of the RGB data. For instance, subarray 71 of array 64 stores a ½ subsampling in both the U and V directions of the R data of array 61. Likewise, subarray 72 stores a ½ subsampling in both the U and V directions of the G data of array 62. Subarray 73 stores a ½ subsampling in both the U and V directions of the B data of array 63. The subsampling process is then carried out again in subarray 74 which has subarrays 81, 82 and 83 which contain ¼ subsamplings in both the U and V directions of the R,G, and B data of arrays 61, 62 and 63, respectively. Likewise, subarrays 91, 92 and 93 of subarray 84 contain ⅛ subsamplings in both the U and V directions of the R,G and B data arrays 61, 62 and 63, respectively. This subsampling is carried out until one texture data per color is obtained. This data structure 51 is referred to as a "mip map." In a mip map 51, the full scale RGB data (in arrays 61, 62 and 63) is said to be subsampled at level d=0, the ½ subsampled RGB data (in arrays 71, 72 and 73) is said to be subsampled at level d=1, and so on. In general, the $2^{-d}$ subsampled data is said to be subsampled at level d.

In order to map texture data onto an object, the appropriate level RGB texture data array is used. Alternatively, if the object surface size is between two arrays that are subsampled at levels d and d+1, a bilinear interpolation between the texture data of the two data arrays is used. The mip map scheme therefore provides a relatively low computation manner of mapping texture onto an arbitrary sized object surface.

Consider now the case where the object is both displaced away from, and rotated with respect to, the plane of view. The mip map can still be used to map texture on to the object surface. However, because the object surface has rotated, the interpolated texture values produced using the mip map may produce aliasing or blurring artifacts in the image. To remedy this problem, U.S. Pat. No. 5,222,205 proposes a modified data structure referred to as a "rip map." A rip map 52 is illustrated in FIG. 3. Illustratively, the rip map 52 shown in FIG. 3 is for the R texture data. Therefore, a rip map for the G and B data would also be provided.

The rip map 52 has a full scale data array 61' including one R value for each pixel of the object surface. Like the mip map 51, the rip map 52 also includes plural subsampled versions of the full scale data array 61'. However, the subsampled arrays of the rip map 52 need not be sampled in each direction U and V the same. For instance, data array 62' is ½ subsampled only in the direction U. Data array 63' is ¼ subsampled only in the direction U. Data array 64' is ⅛ subsampled only in the direction U, and so on. Likewise, data array 65' is ½ subsampled only in the direction V, data array 66' is ¼ subsampled only in the direction V and data array 67' is ⅛ subsampled only in the direction V. The rip map contains other permutations of subsampling, such as data array 75' which is ½ subsampled in the direction U and ⅛ subsampled in the direction V. Two levels of subsampling (du,dv) are therefore used to designate a specific data array. The following table summarizes the assignment of levels to the subsampled data arrays:

TABLE 1

| Label | du | dv | u dir. sampl. | v dir. sampl. |
| --- | --- | --- | --- | --- |
| 61' | 0 | 0 | 1 | 1 |
| 62' | 1 | 0 | ½ | 1 |
| 63' | 2 | 0 | ¼ | 1 |
| 64' | 3 | 0 | ⅛ | 1 |
| 65' | 0 | 1 | 1 | ½ |
| 66' | 0 | 2 | 1 | ¼ |
| 67' | 0 | 3 | 1 | ⅛ |
| 71' | 1 | 1 | ½ | ½ |
| 72' | 2 | 1 | ¼ | ½ |
| 73' | 3 | 1 | ⅛ | ½ |
| 74' | 1 | 2 | ½ | ¼ |
| 75' | 1 | 3 | ½ | ⅛ |
| 81' | 2 | 2 | ¼ | ¼ |
| 82' | 3 | 2 | ⅛ | ¼ |
| 83' | 2 | 3 | ¼ | ⅛ |
| 91' | 3 | 3 | ⅛ | ⅛ |
|  | du | dv | $2^{-du}$ | $2^{-dv}$ |

The rip map 52 provides more choices in subsampled data for use in the interpolation. This tends to reduce the aforementioned aliasing and blurring artifacts.

Desirably, RGB texture data is supplemented with alpha data A to form RGBA data for each pixel. The A data may indicate, for instance, the property of "translucence" or the amount of incident light that can pass through the object. For instance, suppose an object models a green lens which passes 80% of the light incident thereon. If such a lens is placed in front of other objects in the background with respect to the plane of view, then the occluded pixels of the objects should have a blended color. In particular, the occluded object pixels should have a color which is 80% of their original color and 20% of the color of the green lens.

Whether or not one or two data arrays of the mip map or rip map are used, the dimensions of the object surface onto which the texture data is to mapped generally do not exactly equal those of the data arrays. Thus, some process must be provided for selecting amongst the color values of each texture data point of a mip map or rip map data array. For instance, as shown in FIG. 4, a point X on an object surface with non-integral coordinates $(u_x,v_x)$ relative to the data array is at some location in the vicinity of texture data points $(u_0,v_0)$, $(u_1,v_0)$, $(u_0,v_1)$ and $(u_1,v_1)$ of a texture array. According to one technique, the nearest data point, i.e., $(u_0,v_0)$, is selected and the color value of this texture data point $(u_0,v_0)$ is mapped onto the object surface data point X. According to a second technique, a linear interpolation is formed from the color values of each of the four texture data points $(u_0,v_0)$, $(u_1,v_0)$, $(u_0,v_1)$ and $(u_1,v_1)$ based on the distance of the object surface point X to each of these texture data points. To that end, a trilinear process is utilized to determine the interpolated color texture data value. Suppose the horizontal component of the distance from $(u_x,v_x)$ to $(u_0,v_0)$ or $(u_0,v_1)$ is $W_u$ and the vertical component of the distance from $(u_x,v_x)$ to $(u_0,v_0)$ or $(u_1,v_0)$ is $W_v$. As such, the horizontal component of the distance from $(u_x,v_x)$ to $(u_1,v_0)$ or $(u_1,v_1)$ is $1-W_u$ and the vertical component of the distance from $(u_x,v_x)$ to $(u_0,v_1)$ or $(u_1,v_1)$ is $1-W_v$. Note that because the distance between $u_0$ and $u_1$ and between $v_0$ and $v_1$ is 1, both $W_u$ and $W_v$ are fractional values less than 1. Using simple linear interpolation, the interpolated color value can be determined from the following three equations:

$$C_i = C_0(1-W_u) + C_1 \cdot W_u \quad (1)$$

$$C_j = C_2(1-W_u) + C_3 \cdot W_u \quad (2)$$

$$C = C_i(1-W_v) + C_j W_v \quad (3)$$

where:

$C_0$ is the (e.g., R,G,B, or A) color value of the point $(u_0,v_0)$, $C_1$ is the (e.g., R,G,B, or A) color value of the point $(u_1,v_0)$, $C_2$ is the (e.g., R,G,B, or A) color value of the point $(u_0,v_1)$, $C_3$ is the (e.g., R,G,B, or A) color value of the point $(u_1,v_1)$, $C_i$ is the color of an interpolated texture data point $(u_x, v_0)$ between the texture data points $(u_0,v_0)$ and $(u_1,v_0)$, $C_j$ is the color of an interpolated texture data point $(u_x,v_1)$ between the texture data points $(u_0,v_1)$ and $(u_1,v_1)$, and C is the interpolated color value to map onto the point X.

Note that there are actually four total processes for determining the color value from mip map or rip map data arrays to map onto each object surface point, depending on whether the nearest point is used and whether one or two data arrays of the mip map or rip map are used. These are as follows:

(a) Nearest mip map or rip map with nearest color texture data selection: A single mip map or rip map data array is used and the color value of the nearest texture data point to each object surface point is selected;

(b) Nearest mip map or rip map with linear interpolative color texture data selection: A single mip map or rip map data array is used and the color value is interpolated using the trilinear process described above;

(c) Bilinear interpolative mip map or rip map with nearest color texture data selection: Two mip map or rip map data arrays are used and the color value of the nearest data point to each object surface point is selected from each of the two data arrays. This produces two color values (one from each data array). The final color value is a simple linear interpolation between the two color values based on the normalized linear distance of the object surface point to each selected texture data point. For instance, suppose the scaler distance to the nearest point in the first data array is $W_{d1}$ and the scaler distance to the nearest point in the second data array is $W_{d2}$. The normalized distances are $W'_{d1}=W_{d1}/(W_{d1}+W_{d2})$ and $W'_{d2}=W_{d2}/(W_{d1}+W_{d2})$. Note that $W'_{d2}=1-W_{d1}$. If the color value of the nearest point in the first data array is $C_{a1}$ and the color value in the second data array is $C_{a2}$, then the color value to be mapped onto the object surface point is:

$$C=(1-W'_{d1})\cdot C_{a1}+W'_{d1}\cdot C_{a2} \quad (4)$$

(d) Bilinear interpolative mip map or rip map with linear interpolative color texture data selection: Two mip map or rip map data arrays are selected. The interpolated color value in each data array is selected using equations (1)–(3) of the above described trilinear process. The two interpolated color values are then combined using equation (4). Note that the normalized distance $W'_{d1}$ is the same as the normalized distance $W'_{d2}$ in this case, namely, ½.

In each of the interpolation processes (b)–(d) described above, the interpolation is performed by multiplying at least two color values by a respective fractional number and then by adding the two sums together. Such operations prove to be cumbersome and time consuming for most drawing processors 32 (FIG. 1) since they are floating point operations which consume a relatively large number of cycles to perform. This is disadvantageous in the computer system 10, since such long processing reduces the ability to produce real-time 3D rendering, which is required in, for example, flight simulation applications, computer generated animation and moving pictures, virtual reality applications and certain real-time CAD/CAM applications.

It is therefore an object of the present invention to overcome the disadvantages of the prior art.

SUMMARY OF THE INVENTION

This and other objects are achieved by the present invention. According to one embodiment, a process is provided for obtaining an interpolated texture color value $C_r$ from two texture color values $C_{ri}$ and $C_{rj}$ for mapping onto an object surface point. The object surface point is a distance 1−W from one color value $C_{ri}$ and a distance W from the other color value $C_{rj}$, wherein W is a binary decimal number that is less then 1 with a precision of n bits. The process includes the step of obtaining a value $W'=\emptyset 2^{n-1}\cdot W\not c$, where "$\emptyset x \not c$" means the ceiling of x or the rounded value of x. Each of the texture color values $C_{ri}$ and $C_{rj}$ are multiplied by each integer from 0 to $2^{n-1}$ to produce $2^{n-1}$ products for each texture color value $C_{ri}$ and $C_{rj}$. The product of $C_{ri}$ with $2^{n-1}-W'$ and the product of $C_{rj}$ with W' are selected in response to the value W'. These two products $(2^{n-1}-W')C_{ri}$ and $W'\cdot C_{rj}$ are added together to produce the sum $(2^{n-1}-W')C_{ri}+W'\cdot C_{rj}$. The sum is then divided by $2^{n-1}$ to produce the interpolated color value $C_r$.

Thus, according to the process, the binary decimal W is treated as an integer with n−1 bits. This is mathematically equivalent to multiplying both sides of equations (1)–(4) above by $2^{n-1}$. Therefore, to obtain thee final color value, the sum of the products should be divided by $2^{n-1}$. Illustratively, this is done by right-shifting the bits of the sum, wherein only the integer part of the right-shifted result specifies the final color, since color is assumed to be an integral value.

According to another embodiment, an apparatus is provided for producing an interpolated color value $C_r$ from two texture color values $C_{ri}$ and $C_{rj}$. A circuit is provided for producing the value $W'=\emptyset 2^{n-1}\cdot W\not c$. Illustratively, this circuit may be an adder that receives the n most significant bits of W and adds the bit 1 to the $n^{th}$ bit of W. A second circuit is provided for producing the product of each color value $C_{ri}$ and $C_{rj}$ with each integer from 0 to $2^{n-1}$. A multiplexer is provided, which receives the values W' and $2^{n-1}-W'$ and which selects the products $(2^{n-1}-W')\cdot C_{ri}$ and $W'\cdot C_{rj}$. An adder is provided for adding together the products $(2^{n-1}-W')\cdot C_{ri}$ and $W'\cdot C_{rj}$ to produce the sum $(2^{n-1}-W')\cdot C_{ri}+W'\cdot C_{rj}$. A right-shifter circuit is provided for dividing the sum produced by the adder by $2^{n-1}$ to produce the final color value $C_r$.

Illustratively, the circuit for producing products is formed from n−1 parallel left-shifter circuits and a transfer circuit. The left-shifter circuits receive an inputted color value, such as the color value $C_{ri}$, and output n−1 products $2^1\cdot C_{ri}$, $2^2\cdot C_{ri}$, .... $2^{n-1}\cdot C_{ri}$ in parallel. These products represent the multiplication of the texture color value $C_{ri}$ with the integers 2, 4, 8, 16, ..., $2^{n-1}$ (which are all powers of 2). The transfer circuit receives these n−1 products, the texture color value $C_{ri}$ (representing the product of $C_{ri}$ with 1) and 0 and selectively adds, for example, with plural adder circuits, to produce the other products of the texture color value $C_{ri}$ with the integers 3,5,6,7,9,10,11,12,13,14,15, ..., $2^{n-1}-1$ (which are all non-powers of 2). For instance, the product of the texture color value $C_{ri}$ with the integer 3 may be produced by adding together the products of $1\cdot C_{ri}$ and $2\cdot C_{ri}$.

The present invention therefore provides for efficiently producing interpolated color values using few clock cycles. As a result, the invention dramatically speeds up texture mapping so that texture mapping may be employed in real-time applications.

DETAILED DESCRIPTION OF THE INVENTION

Figure 1:
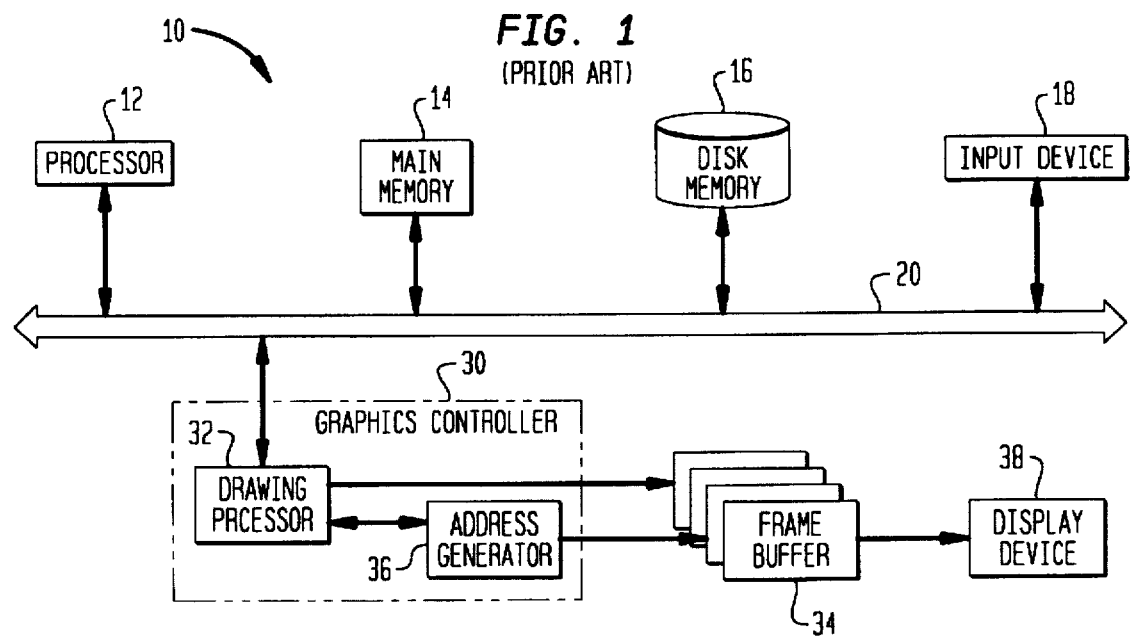
FIG. 1 shows a conventional computer system.
Figure 2:
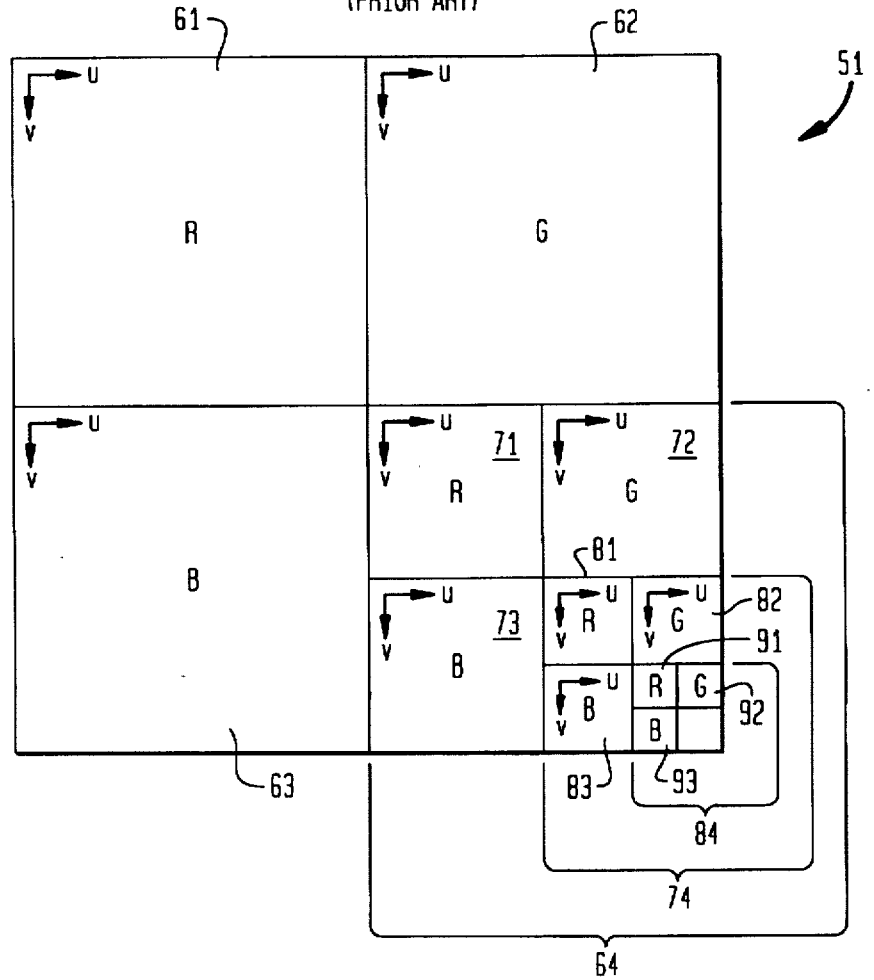
FIG. 2 illustrates a conventional mip map.
Figure 3:
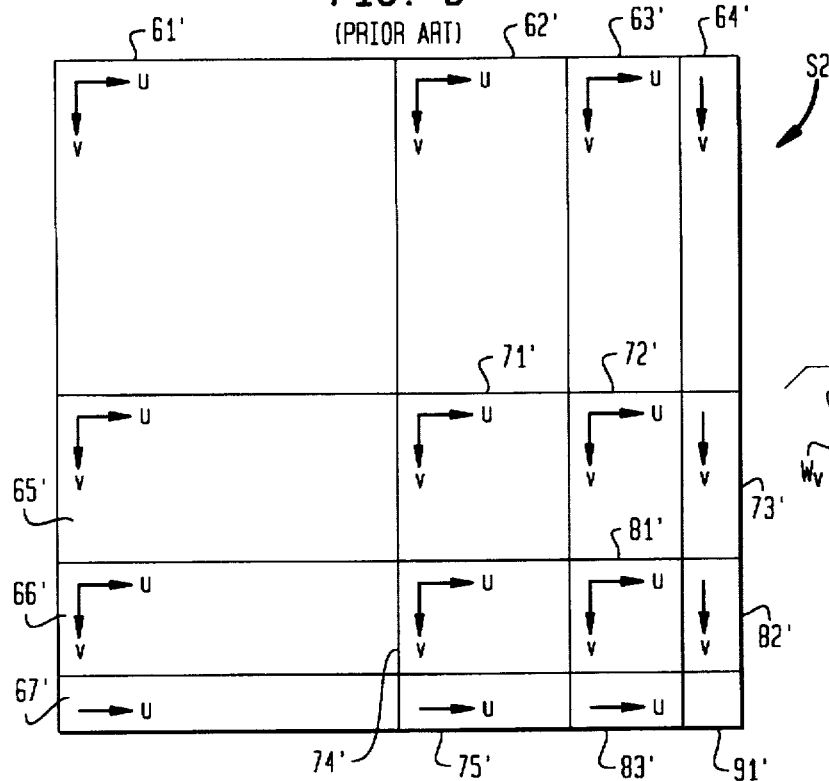
FIG. 3 illustrates a conventional rip map.
Figure 4:
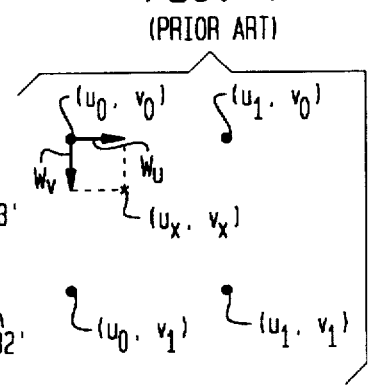
FIG. 4 illustrates a the selection of texture color data for mapping onto an object surface point.
Figure 5:
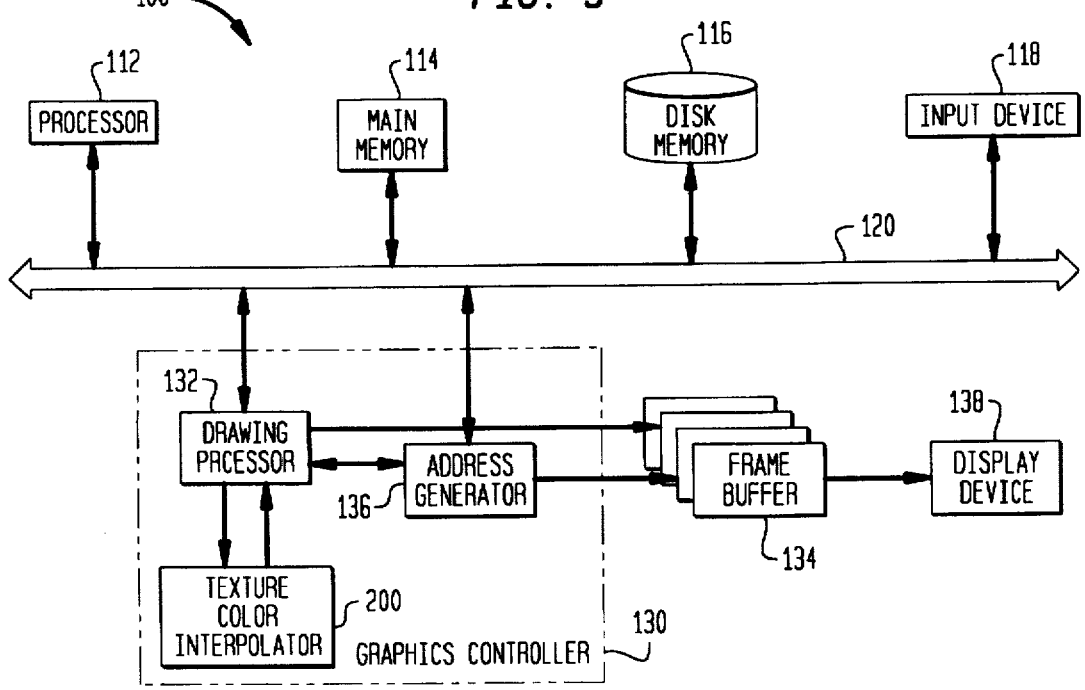
FIG. 5 shows a computer system according to the present invention.

FIG. 5 depicts a computer system 100 according to an embodiment of the present invention. As before, the computer system includes a processor or CPU 112, a main memory 114, a disk memory 116, an input device 118, a bus 120, and a graphics processor 130. The graphics processor 130 includes a drawing processor 132, a frame buffer 134, an address generator 136 and a texture color interpolator 200. A display device 138 is also connected to the frame buffer 134. As before, the drawing processor 132 receives instructions, and information (stored in the main memory 114 or disk memory 116) regarding objects in 3-D space. The drawing processor 132 renders such objects in 3-D space, i.e., draws pixel representations of the images of the objects and then maps texture onto the surface of each object. In mapping texture onto object surfaces, the drawing processor 132 utilizes the texture color interpolator 200 to interpolate texture color values. The images thus produced are stored in frames of the frame buffer 134. The frames in the frame buffer are then displayed on the display device 138.

Figure 6:
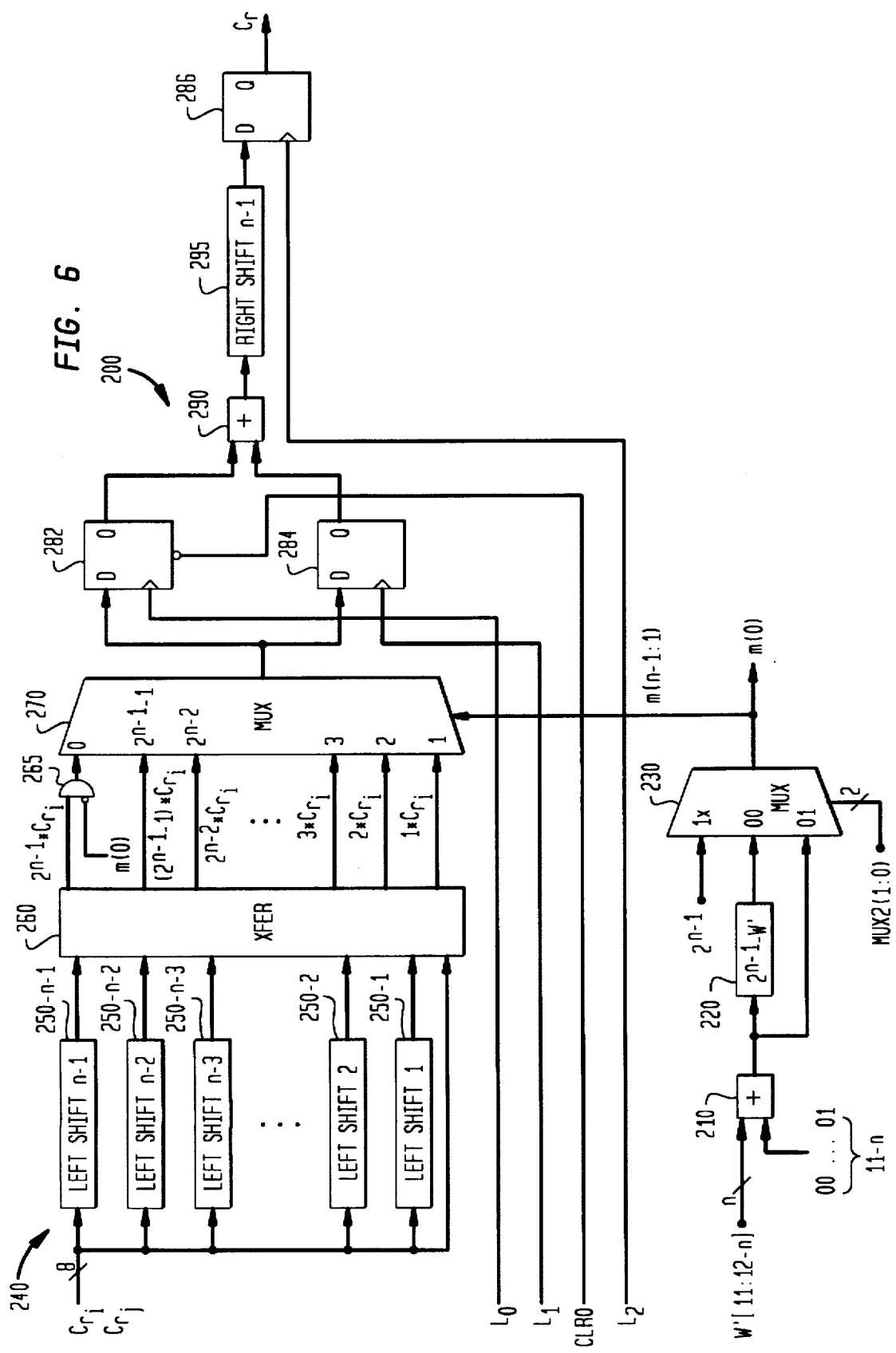
FIG. 6 shows a texture color value interpolator according to an embodiment of the present invention.

FIG. 6 depicts the texture color interpolator 200 according to one embodiment of the invention which forms an interpolated texture color $C_r$ from two texture colors $C_{ri}$ and $C_{rj}$. The texture colors $C_{ri}$ and $C_{rj}$ may be the texture colors associated with particular texture data points $C_i$ and $C_j$ of mip map or rip map data arrays, as per equations (1) and (2) above. Alternatively, the texture colors $C_{ri}$ and $C_{rj}$, themselves, may be interpolated texture colors at interpolated texture data points $C_i$ and $C_j$, respectively, formed from texture colors of particular texture data points in mip map or rip map arrays, as per equation (3) above. Without loss of generality, the texture color $C_r$ is said to be formed for an object surface point that is a distance W from a texture data point $C_i$ and $1-W$ from the texture data point $C_j$ whether $C_i$ and $C_j$ are data points of a mip map or rip map data array, having colors $C_{ri}$ or $C_{rj}$, respectively, or interpolated texture data points $C_i$ and $C_j$ for which interpolated colors $C_{ri}$ and $C_{rj}$ have been formed.

The texture color interpolator 200 has an adder circuit 210 which receives an n bit number W', where n is an integer $\geq 2$. Illustratively, the number W' is provided by the drawing processor 132 (FIG. 5). The value W' is formed from the distance W between an object surface point (onto which texture is to be mapped) to a texture data point (e.g., $C_j$) of one of the colors (e.g., $C_{rj}$) to be interpolated. The n bits of the number W' are treated as including $n-1$ (most significant bits) of an integer portion of $W \cdot 2^{n-1}$ and one (least significant bit) representing a decimal portion of $W \cdot 2^{n-1}$. For sake of convenience, it is presumed that the texture color interpolator 200 operates on 12 bit values. As such, the value W' may be a 12 bit value with the n bits occupying bit positions 11:12−n. The adder 210 adds W with a binary number '0.1' (½ in base ten). For instance, the adder 210 may receive as a second input an n bit number with binary digit 0 in each of the $n-1$ most significant bit positions and 1 in the least significant bit position. Again, assuming that 12 bit values are used, the bits 11:12−n and 11−n:0 are set to '0' and the bit 12−n is set to '1'. The sum thus produced is outputted from the adder 210. In this fashion, the adder 210 rounds the number W' to produce ØW'¢.

The rounded value of W' produced by the adder 210 is received in a subtractor circuit 220. The subtractor circuit 220 subtracts W' from $2^{n-1}$. The difference $(2^{n-1}-W')$ thus produced is inputted to a first input of a multiplexer 230 labeled '00'. A second input of the multiplexer 230 labeled '01' receives the rounded value of W', namely, ØW'¢= ØW·$2^{n-1}$¢, produced by the adder 210. The n bit value '00...0' is received at a third input of the multiplexer 230 labeled '1x' (where x means "don't care"). (Assuming 12 bit values, the third input receives a value with bits 11:12−n set to '0'.) The multiplexer 230 receives a signal MUX2 for selecting as an output one of the three values inputted to inputs labeled 00, 01 and 1x. Illustratively, the signal MUX2 is generated by the drawing processor 132 (FIG. 5).

The value m(n−1:0) selected by the multiplexer 230 is outputted to a product circuit 240. As shown, the product circuit 240 includes n−1 shifter circuits 250-1, 250-2, ..., 250-(n−1), a transfer circuit 260 and a second multiplexer 270. Each of the shifter circuits 250-1 to 250-(n−1) receives, e.g., from the drawing processor 132 (FIG. 5), a texture color value, e.g., $C_{rj}$, in parallel. The shifter circuit 250-1 left-shifts the texture color value $C_{rj}$ one bit position, the shifter circuit 250-2 left-shifts the texture color value $C_{rj}$ 2 bit positions, ..., and the shifter circuit 250-(n−1) left shifts the texture color value $C_{rj}$ n−1 bit positions. The shifter circuits 250-1 to 250-(n−1) output, in parallel, the products $2 \cdot C_{rj}$, $4 \cdot C_{rj}$, ..., $2^{n-1} \cdot C_{rj}$. That is, the shifter circuit 250-1 outputs the product $2 \cdot C_{rj}$, the shifter circuit 250-2 outputs the product $4 \cdot C_{rj}$, etc.

The transfer circuit 260 receives the products $2 \cdot C_{rj}$, $4 \cdot C_{rj}$, ..., $2^{n-1} \cdot C_{rj}$ outputted by the shifter circuits 250-1 to 250-(n−1), the inputted texture color value $C_{rj}$ (representing the product of 1 and the texture color value $C_{rj}$) and the least significant bit m(0) outputted from the multiplexer 230. The transfer circuit 260 produces each product of the texture color $C_{rj}$ with the integers 0,1,2,3 ..., $2^{n-1}$, i.e., 0, $C_{rj}$, $2 \cdot C_{rj}$, $3 \cdot C_{rj}$, ..., $2^{n-1} \cdot C_{rj}$, in parallel. To that end, the transfer circuit 260 illustratively has plural adder circuits which selectively add together the received values $2 \cdot C_{rj}$, $4 \cdot C_{rj}$, ..., $2^{n-1} \cdot C_{rj}$ and $C_{rj}$ to produce the products of $C_{rj}$ with non-powers of 2. For instance, to produce $3 \cdot C_{rj}$, an adder may be provided for adding together the received values $C_{rj}$ and $2 \cdot C_{rj}$. To produce $6 \cdot C_{rj}$ and adder may be provided for adding together $2 \cdot C_{rj}$ and $4 \cdot C_{rj}$, etc. Illustratively, the transfer circuit 260 also has a logical AND gate 265 which receives the value $2^{n-1} \cdot C_{rj}$ at one input and the complement of the least significant bit m(0) outputted from the multiplexer 230. The role of the AND gate 265 is discussed in greater detail below.

Each of the products of 1,2, ..., $2^{n-1}-1$ with the inputted texture color $C_{rj}$, namely, $C_{rj}$, $2 \cdot C_{rj}$, $3 \cdot C_{rj}$, ..., $(2^{n-1}-1) \cdot C_{rj}$, are outputted from the transfer circuit 260 in parallel. In addition, either the product $2^{n-1} \cdot C_{rj}$ or the product $0 \cdot C_{rj}$ is also outputted in parallel with the other products, depending on whether the bit m(0) is '0' (in which case $2^{n-1} \cdot C_{rj}$ is outputted) or '1' (in which case $0 \cdot C_{rj}$ is outputted). Each product outputted by the transfer circuit 260 is received as a selectable input at the multiplexer 270. The multiplexer 270 also receives as a selection control input the n−1 most significant bits m(n−1:1) selected by the multiplexer 230. Depending on the selection control input, the multiplexer 270 selects one of the products inputted thereto for output. The following table summarizes which product is selected depending on the value of m(n−1:1):

TABLE 2

| m(n − 1:1) | Selected product |
| --- | --- |
| 0 | Either $0 \cdot C_{rj}$ or $2^{n-1} \cdot C_{rj}$, depending on m(0) |
| 1 | $1 \cdot C_{rj}$ |
| 2 | $2 \cdot C_{rj}$ |
| ... | ... |
| $2^{n-1} - 1$ | $(2^{n-1} - 1) \cdot C_{rj}$ |

The correspondence of the rounding of W' and the product selected is explained by way of example. Consider the case where W' has n=3 bits $w_2 w_1.w_0$. There are eight possible values which these bits can take on, namely: '00.0', '00.1', '01.0', '01.1', '10.0', '10.1', '11.0', and '11.1' designating eight possible distances W, namely, '.000', '.001', '.010', '.011', '.100', '.101', '.110', and '.1.11' from the texture data point whose color value is to be weighted by the distance W'. After rounding, the eight possible values of W' are, in the order of smallest to greatest: '00.1', '01.0', '01.1', '10.0', '10.1', '11.0', '11.1' and '00.0' (with a carry out of 1). The closer the object surface point $(u_x,v_x)$ is to a point, the greater the weighting which is used. Note, however, that the weighting W indicates how close the object surface point $(u_x,v_x)$ is to the data point whose color is $C_{rj}$. Thus, the weighting is proportional to W' for the color $C_{rj}$. For n=3, there are five possible weightings for the color $C_{rj}$, namely, $0 \cdot C_{rj}$, $1 \cdot C_{rj}$, $2 \cdot C_{rj}$, $3 \cdot C_{rj}$, $4 \cdot C_{rj}$ (because $2^{n-1}=2^{3-1}=2^2=4$). The weightings are assigned to the rounded values of W' as follows: $4 \cdot C_{rj}$ is assigned to '00.0', $1 \cdot C_{rj}$ is assigned to '01.0' and '01.1', $2 \cdot C_{rj}$ is assigned to '10.0' and '10.1', $3 \cdot C_{rj}$ is assigned to '11.0' and '11.1' and $0 \cdot C_{rj}$ is assigned to '00.1'. An inspection of these assignments reveals that the first two bits of the rounded value of W' is sufficient for selecting the appropriate weighting for $C_{rj}$ in all cases except for distinguishing '00.0' from '00.1'. In fact, m(n−1:1) selects the product m(n−1:1) $\cdot C_{rj}$. In the latter case, the complement of the least significant bit is fed to the logic AND gate 265 for selecting 0 when the least significant bit is '1' and for selecting $4 \cdot C_{rj}$ when the least significant bit is '0'. Note that the same relationships hold true for the distance $2^{n-1}-W=4-W$ which is used for weighting the color $C_{ri}$, except that the selected product equals $(2^{n-1}-m(n-1:1)) \cdot C_i$.

The product selected by the multiplexer 270 is outputted in parallel to two latch circuits 282 and 284. The latch circuit 282 receives a strobe signal L0 and the latch circuit 284 receives a strobe signal L1, for example, from the drawing processor 132 (FIG. 5). By generating the appropriate strobe signal L0 or L1, the selected product can be stored in the latch 282 or the latch 284. The latch 282 can also be cleared by a signal CLR0 which may be generated, for example, by the drawing processor 132 (FIG. 5).

The values stored in the latches 282 and 284 are outputted to an adder 290 which produces the sum of the values stored therein. The sum is outputted to a divider circuit 295 which divides the received sum by $2^{n-1}$. Illustratively, the divider circuit 295 is simply a shifter which right-shifts the received sum n−1 bits. The quotient thus produced is outputted to a third latch 286. The third latch 286 also receives a strobe signal L2, for example, from the drawing processor 132 (FIG. 5). In this fashion, the drawing processor 132 (FIG. 5) can cause the quotient outputted from the divider 295 to be stored in the latch 286 at the appropriate time.

The operation of the texture color interpolator 200 is now briefly described by four examples below. The examples are explained using mip maps. However, each example applies equally to rip maps.

Nearest Mip Map, Nearest Color Texture Data Selection

In this example, the drawing processor 132 (FIG. 5) first outputs the signal CLR0 to clear the latch 282 to 0. The drawing processor 132 (FIG. 5) outputs the color of the nearest mip map data array $C_a$ to the circuit 250. The drawing processor 132 (FIG. 5) also outputs the MUX2 signal '1x' to the multiplexer 230. In response, the multiplexer 230 outputs the n bit signal $2^{n-1}$. This causes the multiplexer 270 to select the product of $2^{n-1}$ with the inputted color $C_a$, i.e., $2^{n-1} \cdot C_a$. The drawing processor 132 (FIG. 5) outputs the strobe signal L1 for causing the product $2^{n-1} \cdot C_a$ to be stored in the latch 284. On the next cycle, the adder 290 adds the values stored in the latches 282 and 284, namely 0 and $2^{n-1} \cdot C_a$ to produce the sum $2^{n-1} \cdot C_a$. This sum is then divided by $2^{n-1}$ in the divider 295. The quotient $C_a$ thus produced is inputted to the third latch 286. The drawing processor 132 (FIG. 5) outputs the strobe signal L2 for storing the color value $C_a$ in the latch 286. This color signal $C_a$ is outputted on the next cycle from the texture color interpolator 200 to, for example, the drawing processor 132 (FIG. 5).

Nearest Mip Map, Linear Interpolative Color Selection

In this example, the drawing processor 132 (FIG. 5) uses only a single texture data array of the mip map. However, the object surface point $(u_x,v_x)$ is near four data points $(u_0,v_0)$ with color value $C_0$, $(u_1,v_0)$ with color value $C_1$, $(u_0,v_1)$ with color value $C_2$ and $(u_1,v_1)$ with color value $C_3$. (As above, the object surface data point $(u_x,v_x)$ is a horizontal distance $W_u$ from $(u_0,v_0)$ and $(u_0,v_1)$ and a vertical distance $W_v$ from $(u_0,v_0)$ and $(u_1,v_0)$.) The drawing processor 132 (FIG. 5) uses the texture color interpolator 200 to determine the interpolated color $C_i$ from $C_0$, $C_1$ and $W_u$, as per equation (1). The drawing processor 132 (FIG. 5) then uses the texture color interpolator 200 to determine the interpolated color $C_j$ from $C_2$, $C_3$ and $W_u$ as per equation (2). Finally, the drawing processor 132 (FIG. 5) uses the texture color interpolator 200 to determine C from $C_i$, $C_j$ and $W_v$. Below, the determination of $C_i$ from $C_0$, $C_1$ and $W_u$ is discussed in detail. The discussions of determining $C_j$ and C are omitted since they are analogous to the discussion of determining $C_i$.

On a first cycle, the drawing processor 132 (FIG. 5) outputs as W' the first n bits of $W_u$ with '0' bits appended as the least significant bits of W'. For sake of clarity, this value is referred to as $W_u'$. $W_u'$ is received at the adder 210 which adds the binary value '0.1' (i.e., a value with a zero in each of the n−1 most significant bit positions and a one in the least significant bit position) thereto to round $W_u'$. The drawing processor 132 (FIG. 5) outputs as the MUX2 signal '01' for selecting the rounded value of $W_u'$. The first n bits of $W_u'$ are outputted from the multiplexer 230 as the signal m(n−1:0). The drawing processor 132 (FIG. 5) also outputs the texture color $C_1$ of the point $(u_0,v_1)$ (which is located at a horizontal distance $1-W_u$ from the object surface point $(u_x,v_x)$). The shifter circuits 250-1 to 250-(n−1) output the products $2 \cdot C_1$, $4 \cdot C_1$, ..., $2^{n-1} \cdot C_1$. The transfer circuit 260 receives the products $2 \cdot C_1$, $4 \cdot C_1$, ..., $2^{n-1} \cdot C_1$ and outputs the products $1 \cdot C_1$, $2 \cdot C_1$, $3 \cdot C_1$, ..., $(2^{n-1}-1) \cdot C_1$. Furthermore, depending on the least significant bit of the signal outputted from the multiplexer 230, namely, m(0), the transfer circuit 260 outputs either 0 or $2^{n-1} \cdot C_1$. In response to the signal m(n−1:0), the multiplexer 270 selects the product $W_u' \cdot C_1$. The drawing processor 132 (FIG. 5) outputs the strobe signal L0 for storing the product $W' \cdot C_1$ in the latch 282.

On the next cycle, the drawing processor 132 (FIG. 5) outputs the same W' based on $W_u$ to the adder 210. The adder outputs $W_u'$ to the subtractor 220. The subtractor 220 outputs $2^{n-1}-W_u'$. The drawing processor 132 (FIG. 5) outputs the MUX2 signal '00' for selecting the difference $2^{n-1}-W_u'$ as the signal m(n−1:0).

The drawing processor 132 (FIG. 5) outputs the color $C_0$ to the circuit 250. The above-noted signal m(n−1:0) (carrying the value $2^{n-1}-W_u'$) selects the product $(2^{n-1}-W_u') \cdot C_0$ for output. The drawing processor 132 (FIG. 5) outputs the strobe signal L1 to cause the latch 284 to store the product $(2^{n-1}-W_u') \cdot C_0$.

On the next cycle, the adder 290 receives the products $W_u' \cdot C_1$ and $(2^{n-1}-W_u') \cdot C_0$ and adds them together to produce the sum $W_u' \cdot C_1 + (2^{n-1}-W_u') \cdot C_0$. This sum is outputted to the divider circuit 295 which divides the sum by $2^{n-1}$ to produce the interpolated color value $C_i$. The drawing processor 132 (FIG. 5) outputs the strobe signal L2 for storing the interpolated color value $C_i$ in the latch 286.

On the next cycle, the drawing processor 132 (FIG. 5) reads out the interpolated color value $C_i$ from the latch 286.

The drawing processor 132 (FIG. 5) repeats similar steps to generate the interpolated color value $C_j$ as per equation (2). Then the drawing processor 132 (FIG. 5) repeats similar steps to generate the interpolated color value C as per equation (3).

Bilinear Interpolative Mip Map, Nearest Color Selection

The processing is analogous to the generation of interpolated color $C_i$ from $C_0$, $C_1$ and $W_u$. In this case, however, only a single interpolated color is formed from the color $C_{a1}$ of the nearest data point in the first mip map data array and the color $C_{a2}$ of the nearest data point in the second mip map data array as per equation (4). In this case, the distance outputted from the drawing processor is the normalized distance $W'_{d1}$ to the nearest point in the first data array with the color $C_{a1}$.

Bilinear Interpolative Mip Map, Linear Interpolative Color Selection

Here, the interpolated color is determined in each of the two mip map data arrays as described above. The two interpolated colors are then averaged in an analogous fashion to determining the interpolated color $C_i$ as described above using a distance of $W'=\frac{1}{2}$.

Figure 7:
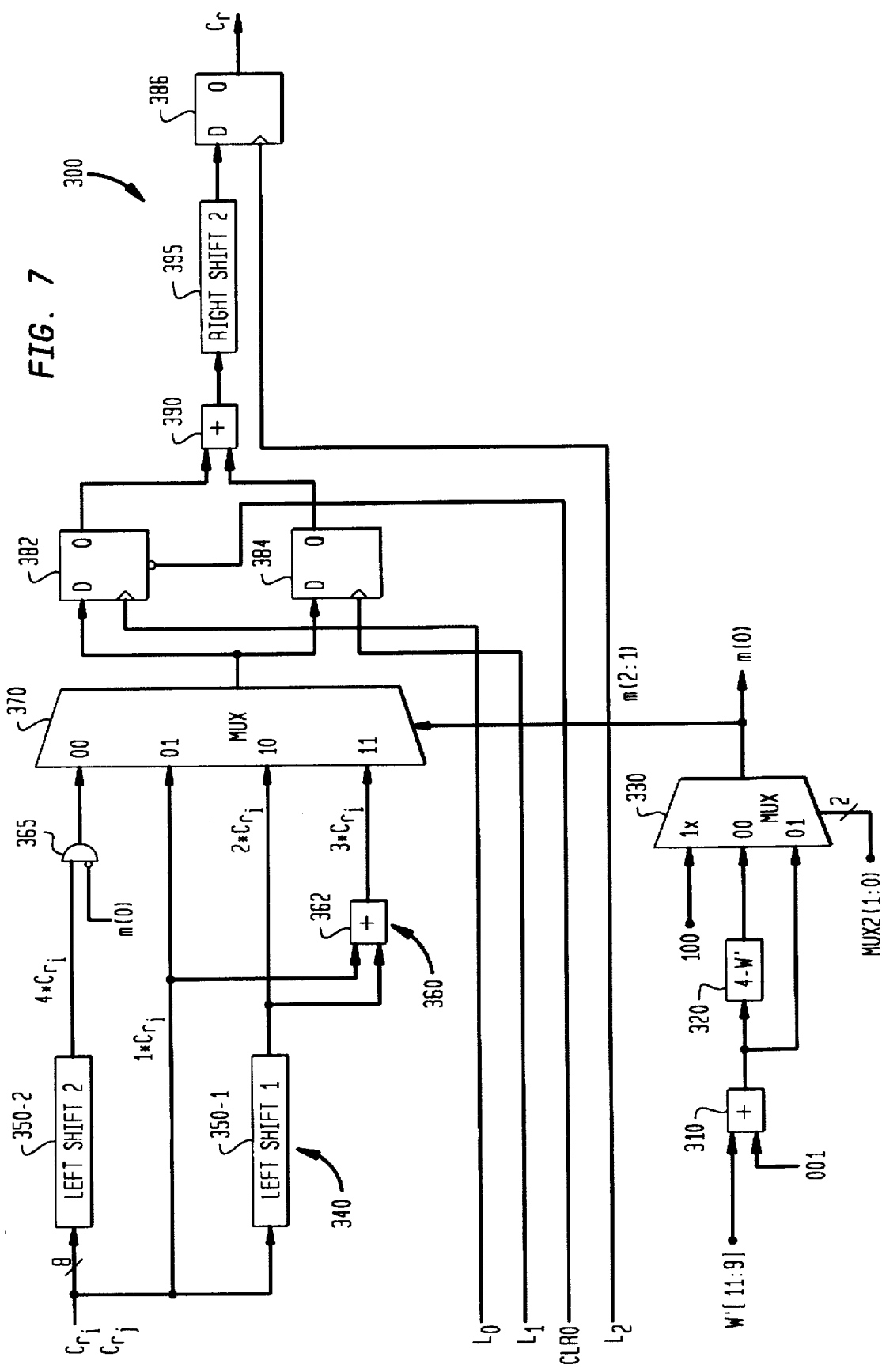
FIG. 7 shows a texture color value interpolator according to a second embodiment of the present invention.

Note that according to the trilinear process (equations (1)–(3)), The object surface point is presumed to fall between four points of a mip map or rip map data array. Generally speaking, a two bit accuracy, with an additional third guard bit, (i.e., n=3 bits) is usually sufficient for describing the distance $W_u$ or $W_v$ for purposes of interpolating texture colors. FIG. 7 shows an embodiment of a texture color interpolator circuit 300 for n=3 bits. As shown, the circuit 300 has corresponding parts to the texture color interpolator 200. The circuit 300 has an adder 310 which adds 001 to the inputted distance W'[11:9]. The subtractor 320 forms the difference $2^{n-1}-W'=2^{3-1}-W'=2^2-W'=4-W'$. The multiplexer 330 outputs a three bit signal m(2:0). The product circuit 340 has n−1=3−1=2 shifters 350-1 and 350-2 for producing the products $2 \cdot C_{ri}$ and $4 \cdot C_{ri}$, respectively. The transfer circuit 360 includes an adder 362 for adding an inputted color $C_{ri}$ to $2 \cdot C_{ri}$ to produce $3 \cdot C_{ri}$. The logical AND gate 365 responds to the complement of the bit m(0) for outputting either $0 \cdot C_{ri}$ or $4 \cdot C_{ri}$. The multiplexer 370 selects one of the products, in response to the signal m(2:1) and stores the selected product in one of the latches 382 or 384. The adder 390 adds the products stored in the latches to produce a sum, and the divider 395 divides the sum thus produced by $2^{-1}=2^{3-1}2^2=4$ (by right-shifting the sum two bits). The latch 386 stores the resulting interpolated color for output.

In short, a process and apparatus are disclosed for obtaining a texture color value $C_r$ for an object surface point from two texture color values $C_{ri}$ and $C_{rj}$ (which themselves may be interpolated texture color values), of texture data points $C_i$ and $C_j$, respectively. The object surface point is a distance W from the texture data point $C_i$ and a distance 1−W from the object surface point $C_j$, where W is an n-bit value. The process includes the steps of multiplying each of the texture colors $C_{ri}$ and $C_{rj}$ by each integer from 0 to $2^n-1$ to produce $2^n-1$ products for each color. The product of $C_{ri}$ with $2^{n-1}-W'$ and the product of $C_{rj}$ with W' are selected from these produced products, where W' is the rounded product of W and $2^{n-1}$. The two selected products are added together to produce the sum $(2^{n-1}-W') \cdot C_{ri}+W' \cdot C_{rj}$, and the sum thus produced is divided by $2^{n-1}$ to produce the interpolated color. The apparatus for producing the interpolated color uses integer arithmetic for producing the texture color and can operate in a pipelined fashion.

Finally, the above-description is intended to be merely illustrative. Those having ordinary skill in the art may devise numerous alternative embodiments without departing from the spirit and scope of the following claims.

The invention claimed is:

1. A method for determining a texture color value $C_r$ to map onto a point of an object surface in 3D space, wherein said object surface point is a distance 0<W<1 from a first texture data point $C_i$ and a distance 1−W from a second texture data point $C_j$, wherein said texture color value $C_r$ is an interpolated color value $C_r$ between the texture color values $C_{ri}$ and $C_{rj}$ of said first and second texture data points $C_i$ and $C_j$, said method comprising the steps of:

(a) multiplying each of said first and second texture color values $C_{ri}$ and $C_{rj}$ by each integer from 0 to $2^{n-1}$, to produce $2^n-1$ products for each of said texture color values $C_{ri}$ and $C_{rj}$, wherein n is an integer >2, (b) selecting said product of $C_{ri}$ with $2^{n-1}-W'$ and said product of $C_{rj}$ with W', wherein W' is an n-bit representation of $W \cdot 2^{n-1}$ with n−1 integer bits and 1 decimal bit, (c) adding said selected products $(2^{n-1}-W') \cdot C_{ri}$ and $W' \cdot C_{rj}$ together to produce a sum $(2^{n-1}-W') \cdot C_{ri}+W' \cdot C_{rj}$, (d) dividing said sum $(2^{n-1}-W') \cdot C_{ri}+W' \cdot C_{rj}$ by $2^{n-1}$ to produce said interpolated color value $C_r$, and (e) displaying the interpolated color value $C_r$ of said object surface on a plane of view.

2. The method of claim 1 wherein said step (a) comprises the steps of:

(a1) for each of said first and second texture color values $C_{ri}$ and $C_{rj}$, shifting, in parallel, said first or second texture color value $C_{ri}$ or $C_{rj}$ by each integral number of bit positions, 1,2,..., n−1, to produce each product $2 \cdot C_{ri}$, $4 \cdot C_{ri}$, ..., $2^{n-1} \cdot C_{ri}$ and $2 \cdot C_{rj}$, $4 \cdot C_{rj}$, ..., $2^{n-1} \cdot C_{rj}$ of said first and second texture color values $C_{ri}$ and $C_{rj}$ with a power of 2, and (a2) selectively adding said products produced in said step (a1) with said texture color values $C_{ri}$ and $C_{rj}$ to produce each product $3 \cdot C_{ri}$, $5 \cdot C_{ri}$, $6 \cdot C_{ri}$, ... $(2^{n-1}-1) \cdot C_{ri}$ and $3 \cdot C_{rj}$, $5 \cdot C_{rj}$, $6 \cdot C_{rj}$, ..., $(2^{n-1}-1) \cdot C_{rj}$ of said first and second texture color values $C_{ri}$ and $C_{rj}$ with a non-power of 2.

3. The method of claim 2 wherein said step (d) further comprises the step of right-shifting said sum by $2^{n-1}$ bits.

4. The method of claim 1 wherein said steps (a) and (b) are performed sequentially for said texture color value $C_{ri}$ first and then for said texture color value $C_{rj}$ prior to performing said steps (c) and (d).

5. The method of claim 1 wherein said steps (a)–(d) are used to perform a trilinear interpolation between four texture data points $(u_0,v_0)$ with color $C_0$, $(u_1,v_0)$ with color $C_1$, $(u_0,v_1)$ with color $C_2$ and $(u_1,v_1)$ with color $C_3$, wherein said object surface point is a horizontal distance $W_u$ from $(u_0,v_0)$ and $(u_0,v_1)$ and a vertical distance $W_v$ from $(u_0, v_0)$ and $(u_1,v_0)$, said method comprising the steps of:

(e) performing steps (a)–(d) with $C_{ri}=C_0$, $C_{rj}=C_1$ and $W=W_u$ to produce an interpolated color $C_r=C_4$, (f) performing steps (a)–(d) with $C_{ri}=C_1$, $C_{rj}=C_2$ and $W=W_u$ to produce an interpolated color $C_r=C_5$, and (g) performing steps (a)–(d) with $C_{ri}=C_4$, $C_{rj}=C_5$ and $W=W_v$.

6. An apparatus for determining a texture color value $C_r$ to map onto a point of an object surface in 3D space, wherein said object surface point is a distance 0<W<1 from a first texture data point $C_i$ and a distance 1−W from a second texture data point $C_j$, wherein said texture color value $C_r$ is an interpolated color value $C_r$ between the texture color values $C_{ri}$ and $C_{rj}$ of said first and second texture data points $C_i$ and $C_j$, said apparatus comprising:

(a) a product circuit for multiplying each of said first and second texture color values $C_{ri}$ and $C_{rj}$ by each integer from 0 to $2^{n-1}$, to produce $2^n-1$ products for each of said texture color values $C_{ri}$ and $C_{rj}$, wherein n is an integer >2, (b) a multiplexer for selecting said product of $C_{ri}$ with $2^{n-1}-W'$ and said product of $C_{rj}$ with W', wherein W' is an n-bit representation of $W \cdot 2^{n-1}$ with n-1 integer bits and 1 decimal bit, (c) an adder for adding said selected products $(2^{n-1}-W') \cdot C_{ri}$ and $W' \cdot C_{rj}$ together to produce a sum $(2^{n-1}-W') C_{ri}+W' \cdot C_{rj}$, and (d) a divider for dividing said sum $(2^{n-1}-W') \cdot C_{ri}+W' \cdot C_{rj}$ by $2^{n-1}$ to produce said interpolated color value $C_r$.

7. A computer system comprising:

a bus, a processor connected to said bus, a memory connected to said bus, a graphics controller connected to said bus, said graphics processor comprising:

a drawing processor for rendering an object in 3D space, and a texture color interpolator, for determining a texture color value $C_r$ to map onto a point of a surface of said object in 3D space, wherein said object surface point is a distance 0<W<1 from a first texture data point $C_i$ and a distance 1−W from a second texture data point $C_j$, wherein said texture color value $C_r$ is an interpolated color value $C_r$ between the texture color values $C_{ri}$ and $C_{rj}$ of said first and second texture data points $C_i$ and $C_j$, said texture color interpolator comprising:

(a) a product circuit for multiplying each of said first and second texture color values $C_{ri}$ and $C_{rj}$ by each integer from 0 to $2^{n-1}$, to produce $2^n-1$ products for each of said texture color values $C_{ri}$ and $C_{rj}$, wherein n is an integer >2, (b) a multiplexer for selecting said product of $C_{ri}$ with $2^{n-1}-W'$ and said product of $C_{rj}$ with W', wherein W' is an n-bit representation of $W \cdot 2^{n-1}$ with n−1 integer bits and 1 decimal bit, (c) an adder for adding said selected products $(2^{n-1}-W') \cdot C_{ri}$ and $W' \cdot C_{rj}$ together to produce a sum $(2^{n-1}-W') \cdot C_{ri}+W' \cdot C_{rj}$, and (d) a divider for dividing said sum $(2^{n-1}-W') \cdot C_{ri}+W' \cdot C_{rj}$ by $2^{n-1}$ to produce said interpolated color value $C_r$.

* * * * *